United States Patent [19]

Fuller

[11] Patent Number: 5,135,723
[45] Date of Patent: Aug. 4, 1992

[54] FLUELESS COMBUSTION SYSTEM FOR TRASH AND WASTE CONVERSION

[76] Inventor: Tom E. Fuller, 3850 E. Friess Dr., Phoenix, Ariz. 85032

[21] Appl. No.: 600,572

[22] Filed: Oct. 19, 1990

[51] Int. Cl.$^5$ ............................................. B09B 3/00
[52] U.S. Cl. ....................................... 422/184; 55/255; 55/256; 110/203; 110/215; 110/235; 110/345; 261/17; 261/124; 261/DIG. 9; 422/177; 423/DIG. 18; 423/DIG. 20; 431/5; 431/253
[58] Field of Search ................... 422/177, 184; 431/5, 431/253; 423/DIG. 18, DIG. 20; 110/203, 215, 235, 345, 346; 261/17, 129, DIG. 9; 55/255, 256

[56] References Cited

U.S. PATENT DOCUMENTS 4,657,566  4/1987  Wintering et al. ..................... 55/256

*Primary Examiner*—Timothy M. McMahon
*Attorney, Agent, or Firm*—James F. Duffy

[57] ABSTRACT

A flueless combustion system which accepts materials nominally designed as trash and waste, including the solid and gaseous combustion products of the system itself, and converts these materials and combustion products to marketable products. Pyrolytic conversion is employed to reform these materials and combustion products. The gaseous combustion products of this system are exhausted to an underwater distribution system which permits the gaseous combustion products to percolate through water which contains cellulosic materials to further absorb and entrap gases. The water, cellulosic materials, as well as sediments resulting from the cooling of the exhaust gases, are utilized within the pyrolytic process. The gases, steam, and heat resulting from the pyrolytic process are used in conversion processes such as the Fisher-Tropsche Process to provide marketable products. For example, the Fisher-Tropsche Process produces liquid fuels. The process utilizes the gases resulting from pyrolysis as feedstock for the reactions required to produce the liquid fuels. Residues representing only three to five percent of the materials input to the combustion system remain to be disposed of at landfill sites or the like. Carbon dioxide gases collected by the system can be employed to enrich the atmosphere within indoor farming enclosures.

19 Claims, 1 Drawing Sheet

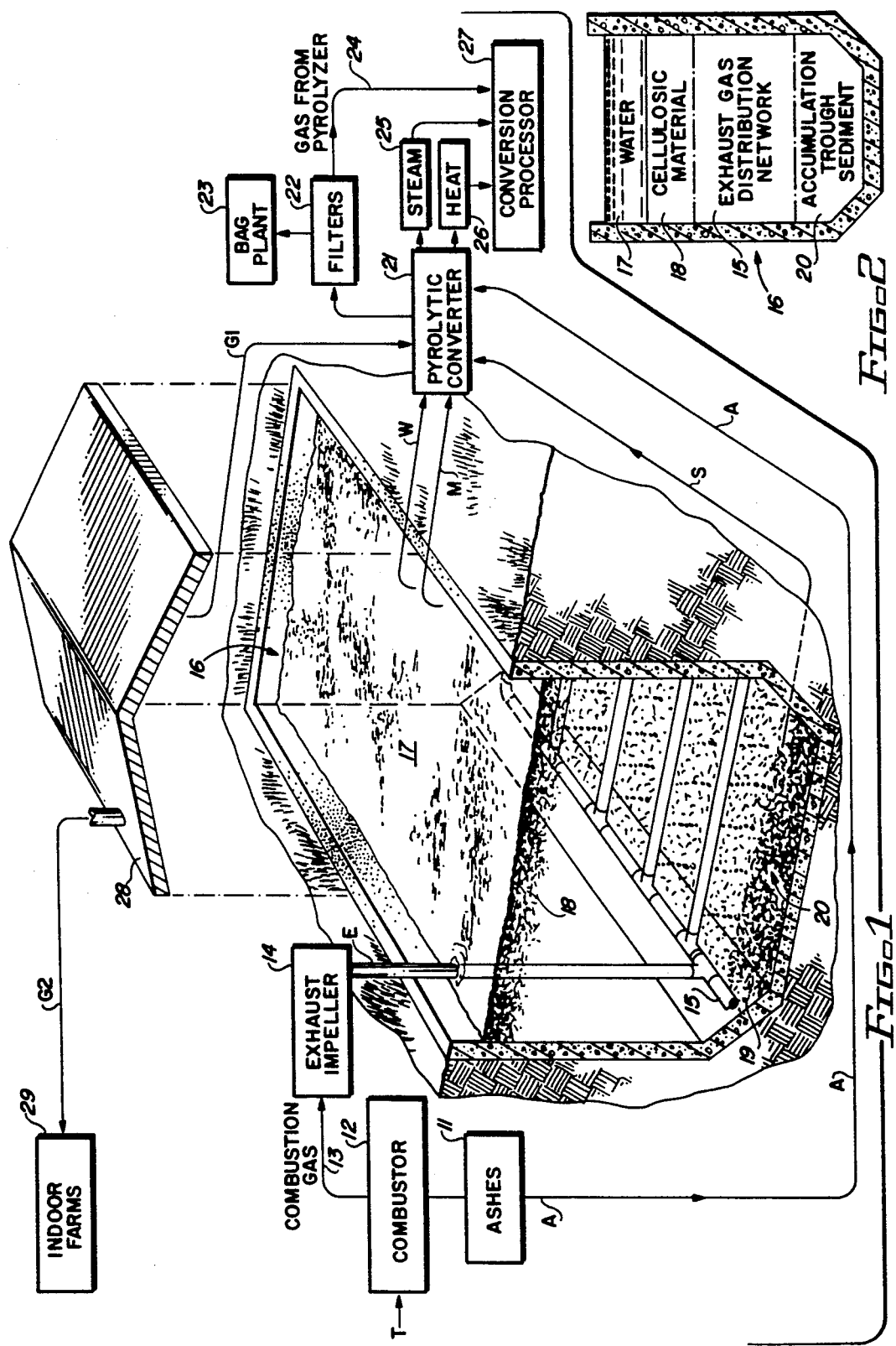

FLUELESS COMBUSTION SYSTEM FOR TRASH AND WASTE CONVERSION

BACKGROUND

1. Field of the Invention

The invention relates to the field of trash combustion. In particular, the invention relates to a system whereby trash is burned without exhausting combustion gases into the atmosphere. The system includes conversion processes for converting exhaust gases, ashes, and cellulosic materials into marketable products.

2. Prior Art

The nation and the world are finally becoming award of the damage that we have been doing to the environment since man discovered fire. This damage has been exacerbated by mass production technology and the internal combustion engine. These processes have spewed combustion products, as well as other handful process gases, into the air to the extent that the very existence of life as we presently know it may very well be in danger.

It is the intent of this invention to provide a trash and waste conversion system into which a flueless combustion process in incorporated.

SUMMARY OF THE INVENTION

The invention is disclosed as an improvement in a combustion system which has combustion means wherein materials are consumed and solid and gaseous combustion wastes are produced. The improvement is seen to comprise and exhaust percolation pond for absorbing gases and accumulating cooled sediments. There is an underwater exhaust gas distribution network in the bond which is coupled to the combustion means. The distribution network is utilized to exhaust hot gaseous combustion wastes from the combustion means and distribute the gaseous wastes throughout the pond. The gaseous wastes are thereby cooled and absorbed by the water within the pond, a certain portion of the gaseous wastes solidifying and accumulating as a sediment within the pond.

There is an exhaust impeller which couples the combustion means and the exhaust gas distribution network. The impeller draws hot gaseous combustion wastes from the combustion means and impels these gases through the underwater gas distribution network wherefrom the gases are exhausted into the pond.

The improvement includes a pyrolytic converter which accepts, in various disclosed combinations, solid combustion wastes from the combustion means, water and sediment from the pond, and, in a disclosed embodiment cellulosic material which, when stored within the pond, will further absorb and entrap gases percolating through the pond.

The pyrolytic converter accepts these materials and water and subjects them to pyrolytic conversion, in the course of which conversion various gases are produced. These gases are fed to a conversion processor to be utilized as a feed stock in selected chemical reactions within the conversion processor as to produce marketable materials.

In a presently preferred embodiment of the invention, the conversion processor is a Fisher-Tropsche Process System which outputs liquid fuels as the marketable material.

A gas entrapment cover over the percolation pond is disclosed for entrapping gases percolating through the pond and escaping therefrom. These gases are conveyed, with the gases produced by the pyrolytic conversion, to the conversion processor as an added feedstock in the chemical reactions taking place therein. A portion of these gases, from the pyrolytic reaction and the entrapment of gases from the percolation pond, can be fed to an indoor farming enclosure to enrich the carbon dioxide content of the atmosphere within the farming enclosure.

Alternatively, the gases entrapped by the cover over the percolation pond may be fed directly to the indoor farming enclosure.

No exhaust gases escape to the atmosphere and the pyrolytic portion of the system is provided with state-of-the-art filters and bag plants to prevent toxic emissions into the environment.

DESCRIPTION OF THE DRAWINGS

FIG. 1 combines a block diagram of the system with a sectional, perspective view of the percolation pond into which combustion exhaust gases are injected.

FIG. 2 is a block diagram representative of a vertical section taken through the percolation pond of FIG. 1.

A DETAILED DESCRIPTION OF THE INVENTION

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

FIG. 1 illustrates a combustion system and the improvements made thereto. The original system comprises a combustor 12 into which trash T or other materials are injected for burning. Combustor 12 may e any conventional burning vessel. However, the presently preferred embodiment of combustor 12 is fluidized bed, rotary kiln. This preference is stated by way of example and not of limitation. As trash and other materials are consumed within combustor 12, solid waste, for example, ashes 11 and gaseous combustion products, designated combustion gas 13 in FIG. 1, are produced. It is the solid wastes, represented by ashes 11, and the gaseous wastes, represented by combustion gas 13, which contribute significantly to the degradation of the environment. The gaseous wastes 13 are freely exhausted into the atmosphere and produce adverse affects on animal and vegetative life. The invention intends to improve upon this prior art system by eliminating the emission of combustion gases into the atmosphere and by drastically reducing the amounts of solid residues which must be disposed of within landfills or otherwise.

The improvement begins by eliminating any smoke stack from the combustor. Instead, an exhaust impeller 14 draws off gaseous combustion wastes 13 and injects them deep within percolation pond 16 via conveyance pathway E.

It should be noted that within the drawing of FIG. 1, various conveyance pathways are indicated by dashed lines. These dashed lines serve two purposes. They represent the pathways along which various materials are conveyed; and, they represent as well the actual means of conveyance for moving the designated materials along those pathways. This arrangement is believed to be readily understandable and to simplify the presentation of the system as represented in FIG. 1.

The gaseous combustion wastes 13 are conveyed along pathway E to perforated pipe, exhaust gas distribution network 15. Gas distribution network 15 is enclosed within the water 17 of percolation pond 16. As the gaseous combustion wastes 13 from combustor 12 are exhausted into the water 17 of pond 16 via distribution network 15, the hot exhaust gases are cooled and a certain portion thereof solidify and settle into the accumulation trough 19 as sediment 20. The remaining gases percolate upwards through the water 17 of pond 16 where much of the gases are absorbed within the water.

To further inhibit the passage of gases to the atmosphere, cellulosic waste materials 18 are introduced into the water of pond 16. Cellulosic wastes may be made up of materials such as cotton trash, citrus residues, rice hulls, peanut shells, and the like. As the gases percolate through this mass of cellulosic material 18, much of it is absorbed by the material as well as being entrapped within the interstices of the material 18. A representation of a sectional view through percolation pond 16 is presented in the block diagram of FIG. 2 which shows the cellulosic material 18 above the exhaust gas distribution network 15 which lies above the accumulation trough sediment 20, all contained within a body of water 17.

The improvement is predicated upon the concept that waste materials represent "waste" only if discarded. The invention proposes the reforming of materials formerly discarded as waste. To this end, a pyrolytic converter 21 accepts materials from percolation pond 16 and solid combustion residues 11 from combustor 12. These materials may be accepted by pyrolytic converter 21 singly or in combination. In practice, more than one pyrolytic converter may be utilized wherein the pyrolysis process is enhanced by a catalyst selected for each pyrolyze with the particular material to be pyrolyzed in mind.

Celluslosic materials 18 will carry a significant amount of water with them as they are conveyed along pathway M to converter 21. Sediments 20 from accumulation trough 19 at the bottom of pond 16 are conveyed along pathway S to converter 21 while solid combustion residues, such as ashes 11, are conveyed along pathway A.

In the course of carrying out the pyrolytic conversion, various gases 24, steam 25, and heat 26 will become available for use in other processes. Such processes may convert the energy of the heat 26 and the steam 25 to work while the gases 24 may be utilized as feedstock for chemical reactions. To represent these various uses of gas 24, steam 25, and heat 26, a block representative of conversion processes 27 is presented in FIG. 1. As an example of the conversion process which is represented by block 27, the invention conceives of the use of a Fisher-Tropsche Process which utilizes gases 24 as feedstock for the conversion of these gases to liquid fuels. The output of the Fisher-Tropsche Process, represented as conversion processes 27 in FIG. 1., may be selected from a variety of liquid fuels such as alcohol, diesel, jet fuel, gasoline, etc. Note that the blocks in FIG. 1, representative of gases 24, steam 25 and heat 26 are also representative of means 24, 25, and 26 for accumulating gases, steam and heat, respectively, until use may be made of these gases, steam and heat in the conversion processes 27.

Because pyrolytic conversion of the various materials input to converter 21 will produce some solid residues, some of which may be toxic, the output of converter 21 is passed through filters 22 and the entrapped residues are packaged within bag plant 23. These packages can be safely disposed of by following environment standards and rules. It is well to note that the materials remaining to be disposed of represent only about three to five percent of the trash T or other materials injected into combustor 12 at the beginning of the process. Thus, there is a 95 percent or better volumetric reduction in the amount of materials which must be disposed of in landfills or by other prescribed means.

It is well to note here, that many municipal landfills are filled to overflowing. Cities and towns are paying vast sums in transporting garage to distant locations, even to foreign countries. By use of the flueless combustion system disclosed herein and represented in FIG. 1, such municipal landfills may be reclaimed. Much of the content of these landfills is salvageable by recycling materials such as paper, glass and metal. The balance of the material on the landfill site may be injected into combustor 12 just as was the trash T in the exemplary disclosure. Usable, marketable products will be returned from the conversion processes 27 while the, almost insignificant, residue can be returned to the landfill.

The water 17 and cellulosic material 18 in pond 16 are regularly replenished as the pyrolytic process goes on. Water 17 may be non-potable water taken from water treatment plants, while the cellulosic residues 18 may be provided by agricultural industries in close proximity to the flueless combustion system. Since many agricultural industries have to pay fees to have such materials carted away from their properties, much of this material can be obtained for little or no cost; or, may even provide a source of income to the operator of the system.

As an additional aid to the community, it is well to note also that undigested sewage sludge may be fed to pyrolytic converter 21 where the cellulosic materials in the sludge are reformed. To further utilize any gasses, for example, carbon dioxide, which may percolate through pond 16 and exit from the surface thereof, an entrapment covering 28 may be emplaced over pond 16 to entrap any gases escaping therefrom. Gases so entrapped may be carried along conveyance path G1 to pyrolytic converter 21 to eventually supplement the feedstock gas 24 available for conversion processes 27. Alternatively, the gases entrapped within covering 28 may be carried along conveyance pathway G2 to indoor farming enclosure 29 where the carbon dioxide content in the entrapped gases will enrich the atmosphere within the farm enclosure. The harvest produced by indoor farming with a carbon dioxide enriched atmosphere is exceptional. The process is in practice today.

What has been disclosed herein is a flueless combustion system which accepts materials nominally designated as trash and waste, including the solid and gaseous combustion products of the system itself, and converts these materials and combustion products to marketable products. Pyrolytic conversion is employed to reform these materials and combustion products. The gaseous combustion products of the system are exhausted to an underwater distribution system which permits the gaseous combustion products to percolate through water which contains cellulosic materials to further absorb and entrap gases. The water, cellulosic materials, as well as sediments resulting from the cooling of the exhaust gases, are utilized within the pyrolytic process. The gases, steam, and heat resulting from the pyrolytic process are used in conversion processes such as the Fisher-Tropsche Process to provide marketable products. For example, the Fisher-Tropsche produces liquid fuels. The process utilizes the gases resulting from pyrolysis as feedstock for the reactions required to produce the liquid fuels. Residues representing only three to five percent of the materials input to the combustion system remain to be disposed of at landfill sites or the like. Carbon dioxide gases collected by the system can be employed to enrich the atmosphere within indoor farming enclosures.

Those skilled in the art will conceive of other embodiments of the invention which may be drawn from the disclose herein. To the extent that such other embodiments are so drawn, it is intended that they shall fall within the ambit of protection provided by the claims herein.

Having described the invention in the foregoing description and drawings in such a clear and concise manner that those skilled in the art may readily understand and practice the invention, that which is claimed is:

1. In a combustion system having means for combustion wherein materials are consumed and solid and gaseous combustion wastes are produced, the improvement comprising:

an exhaust percolation pond for absorbing gases and accumulating cooled sediment:

an underwater exhaust gas distribution network in said pond coupled to said combustion means for exhausting hot gaseous combustion wastes throughout said pond for cooling and absorption therein, a certain portion of said gaseous waste solidifying and accumulating as a sediment within said pond;

an exhaust impeller coupling said combustion means and said exhaust gas distribution network for drawing hot gaseous combustion wastes from said combustion means and impelling said gases through said underwater exhaust gas distribution network to be exhausted therefrom into said pond; and a pyrolytic converter coupled to said pond for acceptance therefrom of water including absorbed gaseous combustion wastes, and sediment produced upon cooling of certain portions of said gaseous combustion wastes, said water and sediment being subject to pyrolytic conversion processes within said pyrolytic converter.

2. The improvement of claim 1 further comprising means coupling said pyrolytic converter to said combustion means for conveying solid combustion wastes therefrom to said pyrolytic converter for pyrolytic conversion.

3. The improvement of claim 1 further comprising means coupled to said pyrolytic converter for accumulating gases produced by pyrolytic conversion processes within said pyrolytic converter.

4. The improvement of claim 3 further comprising means coupled to said accumulating means for accepting gases therefrom and for utilizing said gases as feedstock components of other processes from which marketable materials are produced.

5. The improvement of claim 4 wherein said means for accepting and utilizing said gases from said accumulating means comprises a Fisher-Tropsche Process System and the marketable materials produced are liquid fuels.

6. The improvement of claim 1 further comprising a mass of cellulosic material, contained in said pond, for absorption of said gaseous wastes and entrapment of portions of said gaseous wastes which come into contact with said cellulosic material.

7. The improvement of claim 6 said pyrolytic converter coupled to said pond for acceptance therefrom of cellulosic material from said pond including absorbed and entrapped gaseous wastes.

8. The improvement of claim 7 further comprising means coupling said pyrolytic converter to said combustion means for conveying solid combustion wastes therefrom to said pyrolytic converter for pyrolytic conversion.

9. The improvement of claim 7 furher comprising means coupled to said pyrolytic converter for accumulating gases produced by pyrolytic conversion processes within said pyrolytic converter.

10. The improvement of claim 9 further comprising means coupled to said accumulating means for accepting gases therefrom and for utilizing said gases as feedstock components of other process from which marketable materials are produced.

11. The improvement of claim 10 wherein said means for accepting and utilizing said gases from said accumulating means comprises a Fisher-Tropsche Process System and the marketable materials produced are liquid fuels.

12. The improvement of claim 11 further comprising means coupling said pyrolytic converter to said pond for acceptance therefrom of gaseous combustion waste sediments of pyrolytic conversion within said converter.

13. The improvement of claim 12 further comprising means coupling said pyrolytic converter to said combustion means for conveying solid combustion wastes therefrom to said pyrolytic converter for pyrolytic conversion.

14. The improvement of claim 7 further comprising means coupling said pyrolytic converter to said pond for acceptance therefrom of gaseous combustion waste sediments for pyrolytic conversion within said converter.

15. The improvement of claim 9 further comprising a gas entrapment covering for said pond for trapping gases escaping from the surface of said pond.

16. The improvement of claim 15 furher comprising coupling means coupling said gas entrapment covering and said gas accumulating means for conveying gases entrapped by said covering to said gas accumulating means.

17. The improvement of claim 16 further comprising an indoor farming enclosure and means for coupling a selected portion of said gases accumulated in said gas accumulating means to said indoor farming enclosure for enriching the carbon dioxide atmosphere component within said enclosure.

18. The improvement of claim 1 further comprising a gas entrapment covering for said pond for trapping escaping from the surface of said pond.

19. The improvement of claim 18 further comprising an indoor farming enclosure and means for coupling gases accumulated in said gas entrapment covering to said farming enclosure for enriching the carbon dioxide component of the atmosphere within said enclosure.

* * * * *